Nov. 27, 1956 E. KREISSIG ET AL 2,772,100
PIPE END CONNECTION AND SEALING SYSTEM WITH CENTERING MEANS
Filed Jan. 15, 1953
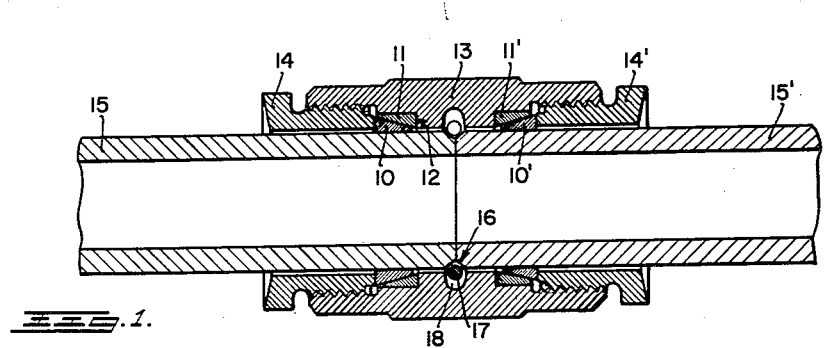
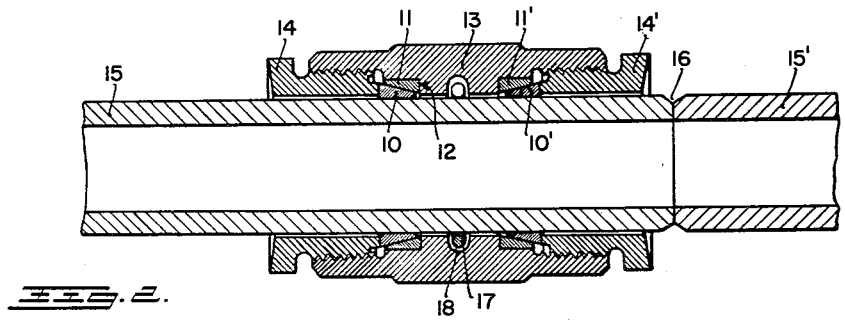
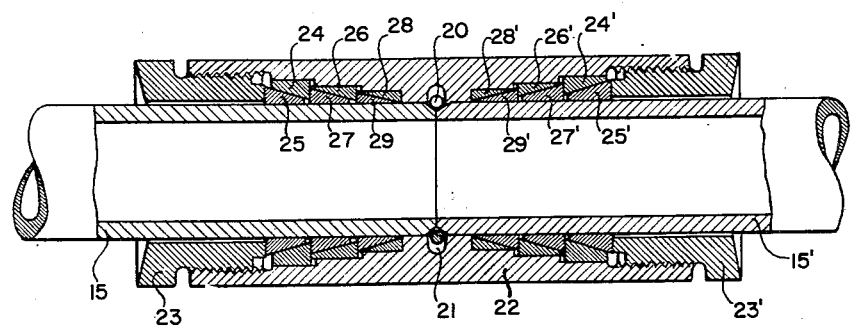
INVENTORS
ERNST KREISSIG
OSKAR ERICH PETER

United States Patent Office 2,772,100
Patented Nov. 27, 1956

2,772,100

PIPE END CONNECTION AND SEALING SYSTEM WITH CENTERING MEANS

Ernst Kreissig, Krefeld-Uerdingen, and Oskar Erich Peter, Oberkochen, Germany

Application January 15, 1953, Serial No. 331,414

1 Claim. (Cl. 285—93)

This invention relates to means for forming a releasable gas-tight and liquid-tight connection between a pair of pipe ends aligned end-to-end, and more particularly relates to means for positioning the union accurately across the opposite pipe ends, while also providing for removal of the union from the opposite pipe ends without disturbing the axial alignment of the pipe ends.

The objects, advantages and details of the invention will become apparent from the following detailed description and in the accompanying drawings, in which we have shown, for purposes of illustration only, certain preferred embodiments of the invention. In the drawings:

Figure 1 shows a pair of pipes joined by a form of union in accordance with the invention;

Figure 2 shows the pipes of Figure 1 with the same union shifted axially to uncover the junction of the pipes; and Figure 3 shows said pipes joined by a modified form of union in accordance with the invention.

Referring now more particularly to the drawings, the form of union shown in Figures 1 and 2 is particularly useful in simplifying the unsealing and resealing of pipe unions when damaged pipe elements must be replaced. According to this form of construction a pair of inner and outer ring springs 10 and 11 are inserted in a counterbore 12 in one end of a locking ring 13, and a like pair of ring springs 10' and 11' are received in a corresponding counterbore in the other end of ring 13. A nut-like ring 14 screws into one end of the ring 13 to axially compress the rings 10 and 11 against the base of the counterbore 12, and a like ring 14' is oppositely threaded into the other end of the ring 13 to axially compress the rings 10' and 11'. This assembly of rings is adapted to slidably receive a pair of pipe ends 15 and 15' when the ring springs 10, 11, 10' and 11' are relaxed. The outer portions of the abutting pipe ends 15 and 15' are chamfered to form an annular groove 16 therebetween in which a split snap ring 17, ordinarily metal, is snugly receivable. A central internal annular groove 18 is formed in the ring 13 with a sufficient depth to entirely receive the snap ring 17 when it is expanded to slide along either of the pipe ends 15 and 15'. The snap ring 17 may be compressed to be slid along the opening through the ring 13 for purposes of inserting it in the groove 18, and in relaxed condition the snap ring 17 is large enough to stay in the groove 18 when the assembly of rings is not on any pipe end (the groove being indented to a depth not substantially exceeding the thickness of the snap ring measured in the direction of said depth, as shown in Figure 2, so that the snap ring will not fall out), and small enough to spring into the groove 16 as shown in Figure 1. The rings can be assembled in an independent unit and slid over one of the pipe ends 15, as shown in Figure 2, and the other pipe end 15' can then be brought into abutting relation with the pipe end 15. The assembly of rings is then slid from the offset position shown in Figure 2 into the position shown in Figure 1, which is automatically indicated by the snapping of the ring 17 into the groove 16. The rings 14 and 14' are then screwed into the ring 13 to wedge the ring springs 11 and 11' outwardly against the ring 13 and rings 10 and 10' inwardly against the pipe ends 15 and 15'. This effects a tight seal on both sides of the joint entirely around and across the abutting pipe ends, since the ring 13 extends all around the joint and the wedged ring springs seal off the only avenue of escape of fluid from the pipes. When the rings 14 and 14' are screwed the other way the ring springs 10, 11, 10' and 11' resiliently resume their original positions and release their grip on each other and on the ring 13 and the pipe ends 15 and 15'. The ring 13 can then be shifted axially back to the position shown in Figure 1, to uncover the opposite ends of the pipes.

The form of union shown in Figure 3 is particularly suitable for conduits for gas or liquid under especially high pressure. The pipe ends 15 and 15' are chamfered in the same way as in Figures 1 and 2 to provide a groove for a similar snap ring 20 received in a like groove 21 in a locking ring 22 corresponding generally to the ring 13. A nut-like ring 23 is screwed into one end of the ring 22 to press axially against a ring spring 25 at one end of three pairs of ring springs 24 and 25, 26 and 27, and 28 and 29. These ring springs are received in successive counterbores in the ring 22, with the ring 28 abutting at one end against the inner end of the deepest counterbore. When the ring 23 is screwed into the ring 22 its axial thrust is transmitted through the rings 25, 24, 27, 26, 29 and 28, in that order. Each of these pairs of ring springs has interengaging conical surfaces so that such thrust wedges the rings 25, 27 and 29 inwardly against the pipe end 15 and wedges the rings 24, 26 and 28 outwardly against the ring 22, thereby forming a tight triple seal between the pipe end 15 and ring 22 on one side of the joint between the abutting pipe ends. A like ring 23' is oppositely threaded into the opposite end of the ring 22 to press axially against a like series of rings 24'–29' to effect a like triple seal between the pipe end 15' and ring 22 on the other side of the joint between the abutting pipe ends. When the rings 23 and 23' are screwed the other way the grip on the pipe ends 15 and 15' is released, and the ring assembly is shiftable onto one of the pipe ends in a manner like that previously described in connection with Figures 1 and 2.

While we have illustrated and described certain present preferred embodiments of the invention, it will be recognized that the invention may be otherwise variously embodied and practiced within the scope of the following claim.

We claim:

In combination, a pair of end-to-end pipe ends, each of said pipe ends being chamfered around its outer terminal edge, and a union releasably sealing the joint between said pipe ends, comprising a ring having a cylindrical bore extending in a closed circle around and between the adjacent pipe ends and having an annular groove around the mid-portion of the bore, a resilient snap ring in said groove for positioning the union on the pipe ends, the groove being indented to a depth not substantially exceeding the thickness of the snap ring measured in the direction of said depth, said snap ring being expansible out of the bore into the groove, and when not flexed having the average of its inner end outer diameters substantially equal to the diameter of said bore, so that the snap ring resiliently enters the annular groove formed by the opposed chamfered ends of the pipe ends when the snap ring is moved to the last-mentioned groove, and is cammed out of the last-mentioned groove by the chamfer on one of the pipe ends when the union is shifted axially along one of the pipe ends, and means for releasably sealing the opposite ends of the first-mentioned ring around the respective pipe ends.

References Cited in the file of this patent

UNITED STATES PATENTS

| | | |
|---|---|---|
| 91,319 | Fifield | June 15, 1869 |
| 664,143 | Garlock | Dec. 18, 1900 |
| 701,019 | Diescher | May 27, 1902 |
| 731,635 | Vandergrift | June 23, 1903 |
| 762,758 | Post | June 14, 1904 |
| 796,580 | Johnston | Aug. 8, 1905 |
| 1,363,320 | Horiuchi | Dec. 28, 1920 |
| 1,644,118 | Florence | Oct. 4, 1927 |
| 1,793,455 | Buchanan | Feb. 24, 1931 |
| 1,936,815 | Wilkinson | Nov. 28, 1933 |
| 1,937,086 | Kaplan | Nov. 28, 1933 |
| 2,005,189 | Herr | June 18, 1935 |
| 2,105,747 | Martin | Jan. 18, 1938 |
| 2,132,148 | Davis | Oct. 4, 1938 |
| 2,423,655 | Mars et al. | July 8, 1947 |
| 2,582,997 | Laurent | Jan. 22, 1952 |
| 2,640,716 | Bigelow | June 2, 1953 |

FOREIGN PATENTS

| | | |
|---|---|---|
| 18,243 | Australia | Aug. 6, 1934 |
| 247,812 | Switzerland | Dec. 16, 1947 |
| 398,682 | Great Britain | Sept. 21, 1933 |
| 619,161 | Germany | Sept. 24, 1935 |
| 804,334 | France | Oct. 21, 1936 |
| 838,977 | Germany | May 15, 1952 |